United States Patent [19]

Fornasari

[11] Patent Number: 4,691,516
[45] Date of Patent: Sep. 8, 1987

[54] THERMALLY-ACTIVATED DEVICE FOR CREATING CONSIDERABLE POWER

[75] Inventor: Paolo Fornasari, Casale Monferrato, Italy

[73] Assignee: Eltek S.p.A., Alessandria, Italy

[21] Appl. No.: 830,257

[22] Filed: Feb. 14, 1986

[30] Foreign Application Priority Data

Feb. 22, 1985 [IT] Italy .............................. 53024/85[U]

[51] Int. Cl.⁴ ............................................. F03G 7/06
[52] U.S. Cl. .................................................... 60/527
[58] Field of Search ............... 60/527, 530; 236/99 K, 236/101 R

[56] References Cited

U.S. PATENT DOCUMENTS 4,207,767  6/1980  Schmucki .................. 60/527 X
4,441,317  4/1984  Wolfe et al. ................. 60/527

Primary Examiner—Allen M. Ostrager
Attorney, Agent, or Firm—Browdy and Neimark

[57] ABSTRACT

A thermal actuator is provided in which a thermally expansible material such as a high melting point wax is heated to produce linear movement of an actuator element. A secondary chamber containing a biconical mass provides a sealing chamber for the wax.

11 Claims, 5 Drawing Figures

THERMALLY-ACTIVATED DEVICE FOR CREATING CONSIDERABLE POWER

This invention relates to a device, which if heated under controlled conditions, causes an element to move in a rectilinear fashion and has considerable power.

The present invention comprises a sturdy casing, the inside of which is divided into two chambers connected by a tubular passage containing a mobile cylindrical rod. One chamber of the casing is blind and is filled with a high melting point wax; one end of the rod is immersed in the wax and the other projects from the casing after passing through the second chamber which acts as a seal for the wax, or any other material which expands on heating, contained in the blind chamber.

The invention is intended to be a power element used to control a part such as a refrigerator check valve controlling the flow of a refrigerant in the gas stage, a washing machine or dishwasher water check valve; or activates a device which dispenses detergent and/or rinsing agents in dishwashers; or activates or stops the water jets in dishwashers; or activates a refrigerator ice dispenser.

The present invention can clearly also be used for all purposes other than those described above, where considerable power in a rectilinear direction is needed, which however can be transmitted in other directions.

Figure 1:
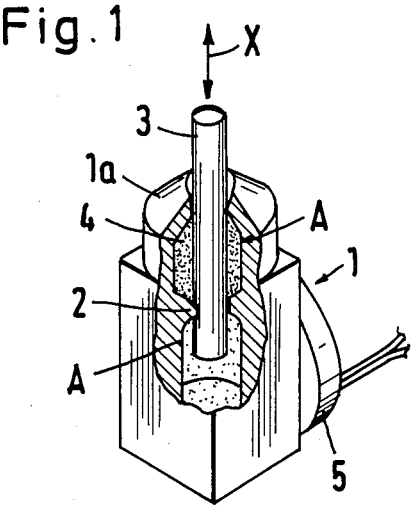
Figure 2:
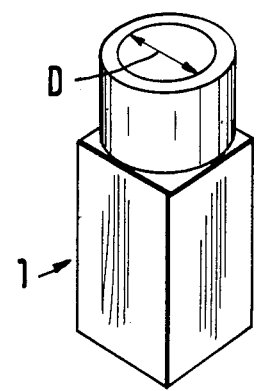
Figure 3:
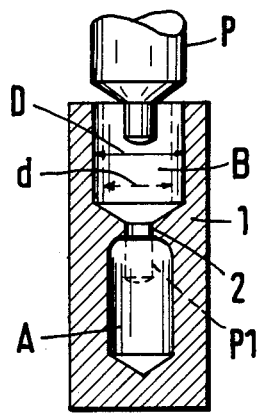
Figure 4:
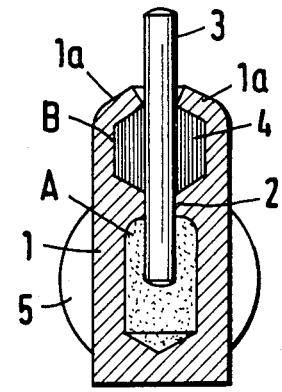
Figure 5:
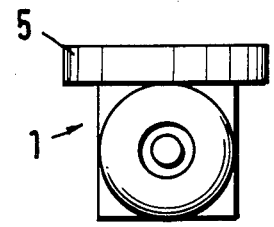

The invention will be described further, by way of example, with reference to the accompanying drawings, in which:

FIG. 1 is a cut-away view in perspective of the device;
FIG. 2 shows the casing in perspective;
FIG. 3 is a vertical cut-away view of the empty casing when being constructed;
FIG. 4 is a vertical cut-away view of the completed device;
FIG. 5 is schematic view from above of the device.

With reference to FIG. 1, the casing of the device is constructed of a metal having high thermal conductivity and low thermal retention. The casing 1 is preferably made of aluminum or one of its alloys, or copper or one of its alloys.

With reference to FIG. 3, the casing 1 is drilled at a diameter -d- and then using a punch having a diameter -D-, the upper part of the casing is created by cold forming. The punching operation pushes the excess metal downwards so that when the tip P1 of the punch P reaches the position indicated by the dashed line, the inside of the casing is divided into two chambers A and B connected by a tubular passage 2, the inside of which is then ground.

Wax, or other materials having high thermal dilative properties, is placed in chamber A.

A rod, which has been ground so that its exterior surface has a roughness less than or equal to $0.05\mu$, is inserted in the tubular pasage 2.

A biconical mass 4, made preferably of polytetrafluoroethylene (PTFE), is placed in chamber B. With reference to FIGS. 1 and 4, the top 1a is of the casing is closed creating a guide which however does not come in contact with the outer surface of the rod 3.

When the device comes in contact with any controlled source of heat, for instance a thermistor 5 (FIGS. 1, 4, and 5), the wax in A expands causing rod 3 to move in the direction indicated by arrow -x- (FIG. 1). The material in the biconical chamber 4 also expands to a certain extent assuring an excellent seal for the wax in A, both with respect to outer surface of rod 3 and the internal surface of chamber B. When the heat generated by any suitable thermal source ceases, and the wax in chamber A cools, rod 3 returns to its vertical resting position by means of an elastic device (not shown) which is external to the compact structure of the device.

The wax, or other materials having high thermal dilative properties, in chamber A can also contain pulverized copper or aluminum to enhance its expansive properties.

The stucture, in particular the external structure, of the casing is not limited to that shown here. The invention also includes any other similar or equivalent mechanical device.

What is claimed is:

1. A thermally-activated device generating considerable power; said power being in the form of an axial thrust transmitted to a rod, said device comprising a metal casing divided into two chambers connected by a tubular passage; the first chamber containing wax or other material having high thermal dilative properties; and the second chamber containing a biconical mass with a vertical hole, coaxial to the tubular passage; said mass being made of a synthetic thermally-expandable material; a cylindrical metal rod passing vertically through said mass; one end of the rod being immersed in the contents of said first chamber consisting of wax or other thermally expandable material and the other end of the rod projects from the top of the casing at the end opposite to the blind end in order to create a power device that causes the axial movement of rod towards the outside of the casing when the device is thermally activated by means of any source of heat.

2. A device as claimed in claim 1, in which the casing of the device is initially drilled at a diameter of -d- creating a single cylindrical chamber, which is then divided into distinct chambers by a punching operation with a punch having a diameter -D-, greater than the diameter of the hole initially drilled, creating a tubular passage as a result of the excess metal being pushed downwards, where rod slides back and forth.

3. A device as claimed in claim 1, in which the biconical mass contained in said second chamber is made of polytetrafluoroethylene.

4. A device as claimed in claim 1, in which heat makes the biconical mass contained in said second chamber expand developing radial thrust absorbed by the rod and by the walls of said fluid chamber creating a seal for the wax or other suitable material contained in said fluid chamber when the wax expands as a result of heat being applied.

5. A device as claimed in claim 1 in which the thermally-expandable material contained in said first chamber is mixed with pulverized metal.

6. A device as claimed in claim 1, in which the thermally dilative material contained in said first chamber is mixed with pulverized copper or aluminum.

7. A device as claimed in claim 1, in which the cylindrical mobile rod has a surface roughness less than or equal to $0.05\mu$.

8. A device as claimed in claim 1, in which its simple compact construction lends itself to an automated and/or robotized assembly.

9. A device as claimed in claim 1, in which the heat source consists of a thermistor connected to a power supply circuit.

10. A device as claimed in claim 1, in which said first chamber is a fluid chamber, said fluid comprising said wax or other materials having said high thermal dilative properties.

11. A device as claimed in claim 1, said first chamber being a blind chamber.

* * * * *